United States Patent [19]

Martin

[11] Patent Number: 4,613,100

[45] Date of Patent: Sep. 23, 1986

[54] AIRCRAFT EJECTION SYSTEM

[75] Inventor: John S. Martin, Denham, Nr. Uxbridge, England

[73] Assignee: Engineering Patents & Equipment Limited, St. Peter, Channel Islands

[21] Appl. No.: 522,393

[22] Filed: Aug. 11, 1983

[51] Int. Cl.[4] .................................... B64D 25/10
[52] U.S. Cl. ........................ 244/122 AD; 244/122 R
[58] Field of Search .... 244/122 A, 122 AD, 122 AB, 244/3.22, 3.21, 122 R

[56] References Cited

U.S. PATENT DOCUMENTS

| 3,034,434 | 5/1962 | Swaim et al. | 244/3.22 |
| 3,079,111 | 2/1963 | Throp | 244/122 AD |
| 3,222,015 | 12/1965 | Larsen et al. | 244/122 A |
| 3,304,029 | 2/1967 | Ludtke | 244/3.22 |
| 3,362,662 | 1/1968 | McIntyre et al. | 244/122 AD |
| 3,446,023 | 5/1969 | Mosier | 244/3.22 |
| 3,487,445 | 12/1969 | Gluhareff et al. | 244/122 AD |
| 3,606,221 | 9/1971 | Morris et al. | 244/122 AD |
| 3,648,955 | 3/1972 | Stencel et al. | 244/122 AD |
| 3,979,089 | 9/1976 | Miller et al. | 244/122 AD |

FOREIGN PATENT DOCUMENTS

| 941683 | 11/1963 | United Kingdom . |
| 1042629 | 9/1966 | United Kingdom . |
| 1342912 | 1/1974 | United Kingdom . |
| 1348374 | 3/1974 | United Kingdom . |

OTHER PUBLICATIONS

Terry Ford, "Developments at Martin-Baker," 751 Aircraft Engineering, vol. 54, No. 10, London, Great-Britain (Oct. 1982), pp. 22-25.

Primary Examiner—Sherman D. Basinger
Assistant Examiner—Rodney Corl
Attorney, Agent, or Firm—Spencer & Frank

[57] ABSTRACT

Each of two aircraft ejection seats, initially mounted in a side-by-side arrangement in an aircraft, has a primary rocket motor for accelerating the seat/airman combination on ejection, by producing a thrust vector substantially through the center of gravity of the combination, and having a substantial component along that axis of the seat/airman combination about which the combination is rotationally balanced, which lies closest to parallelism with the vertical center line of the airman. To ensure separation, upon ejection, between the two ejection seats, each has, in addition to its primary rocket motor, a lateral thrust rocket motor arranged to produce a transverse thrust vector which passes through said axis at a position spaced from said center of gravity, so as to produce a rotational moment acting on the combination, whereby the two seats are caused to move in respective arcs diverging from one another, but without spinning about said axis.

6 Claims, 11 Drawing Figures

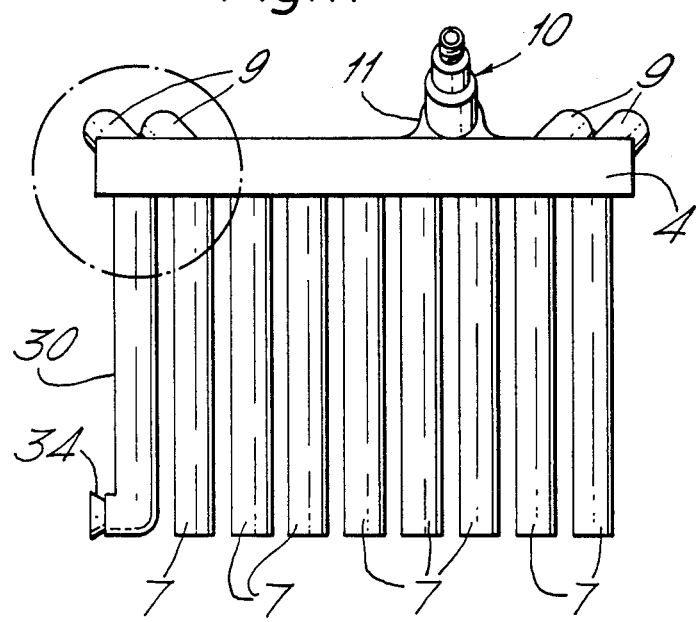
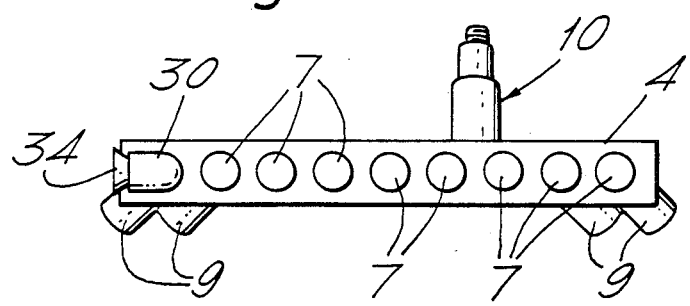

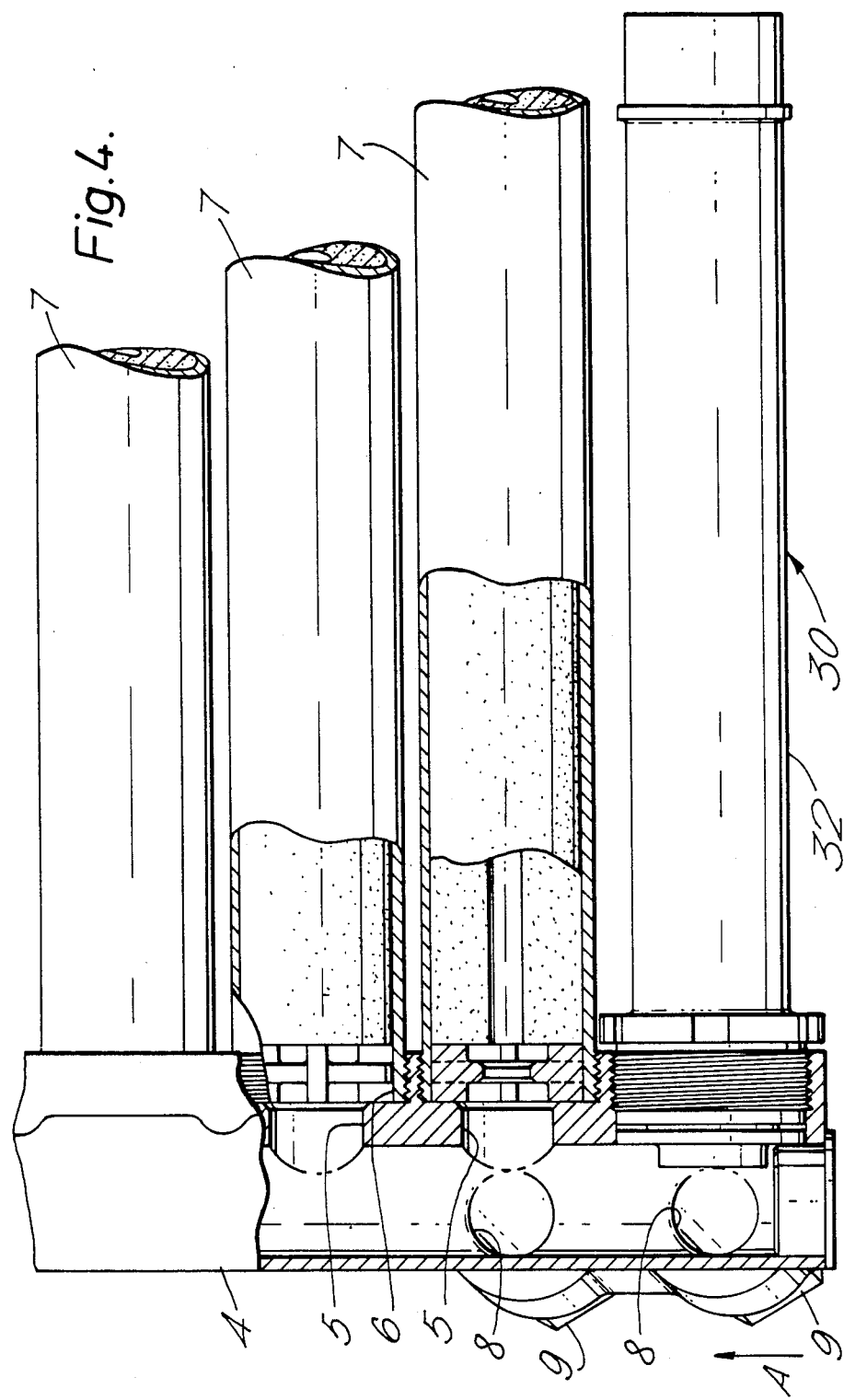

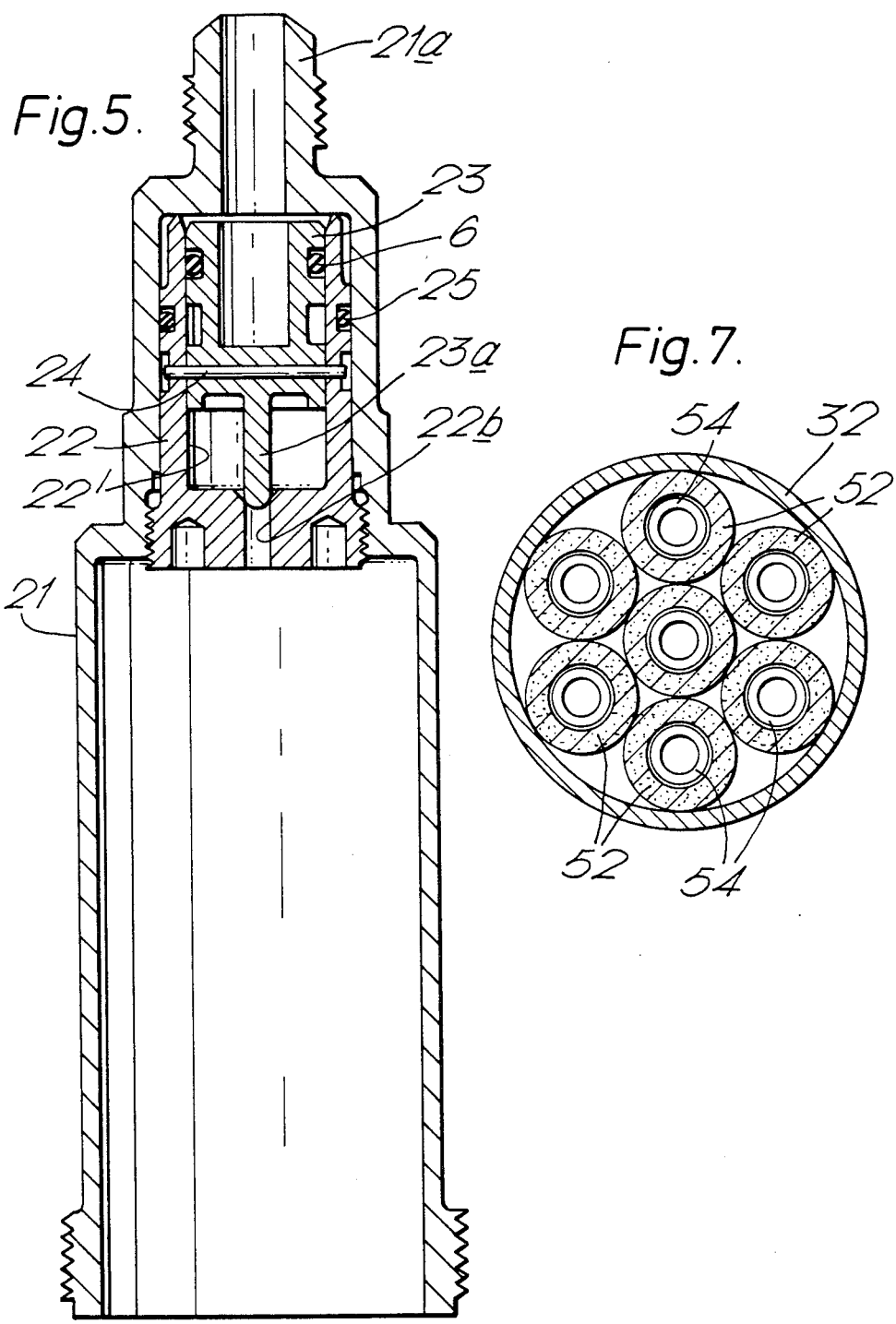

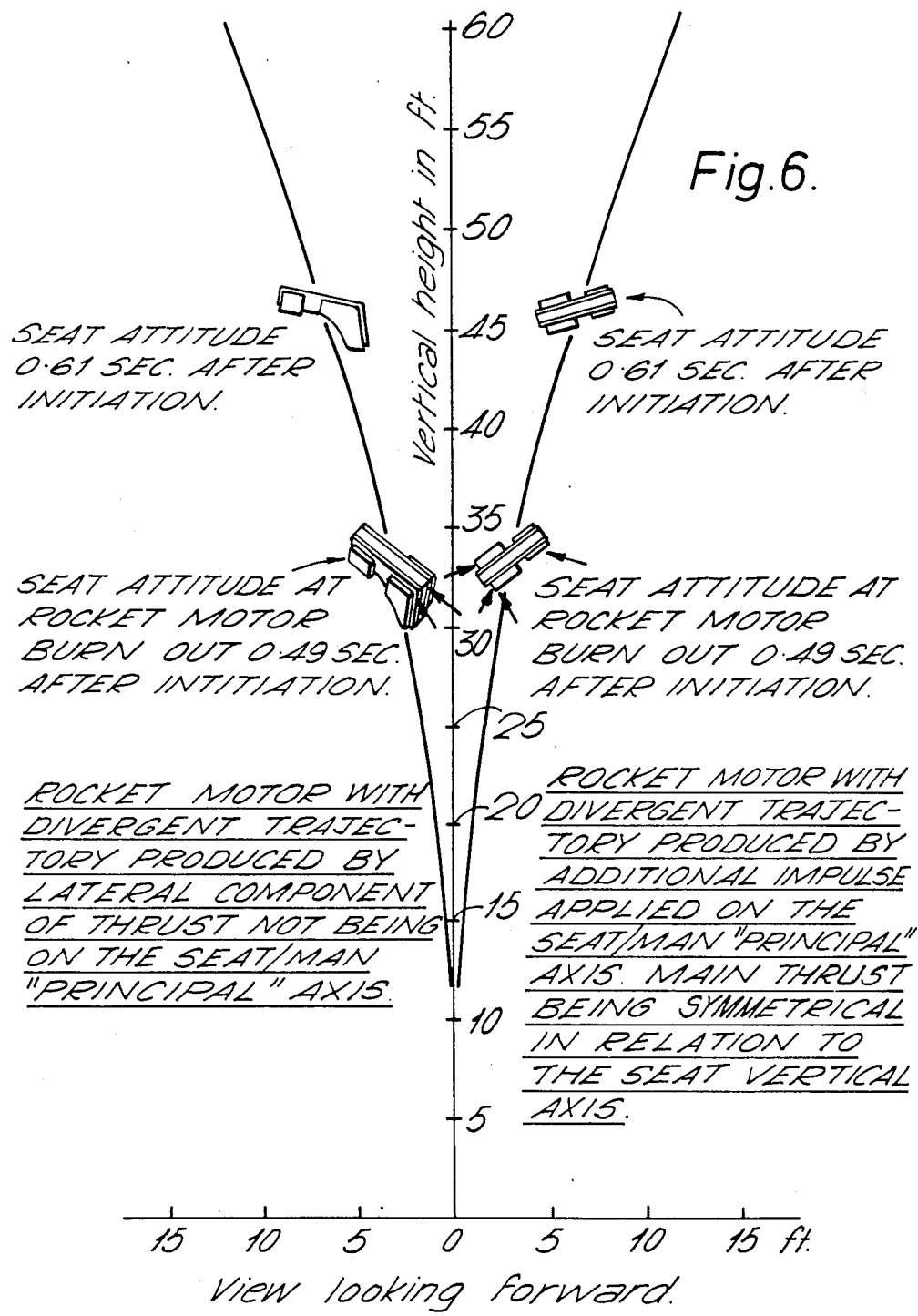

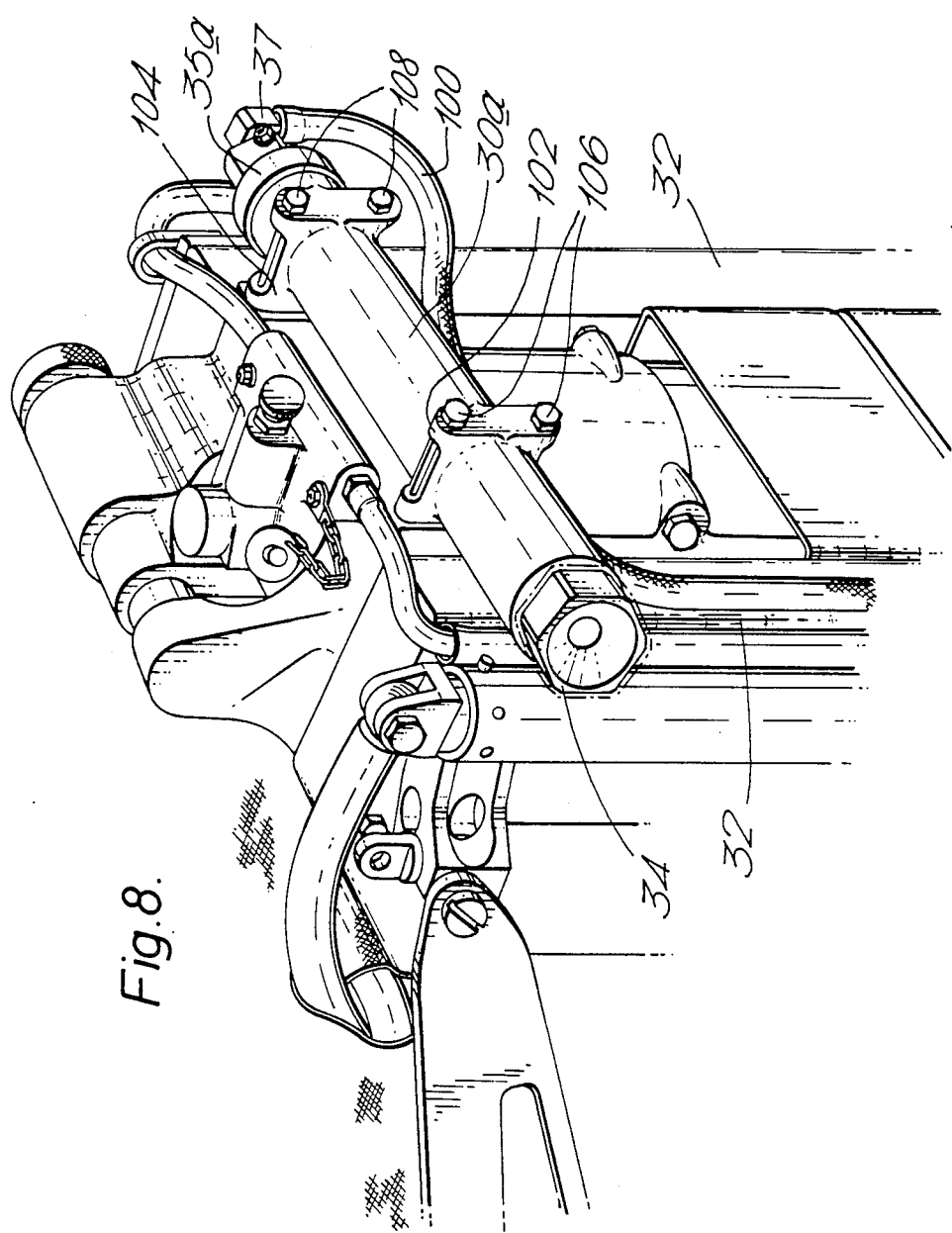

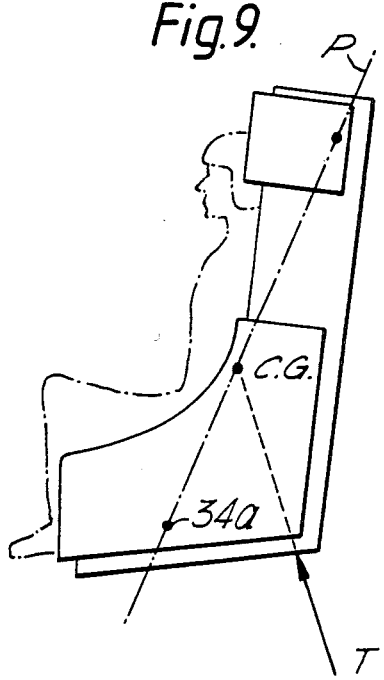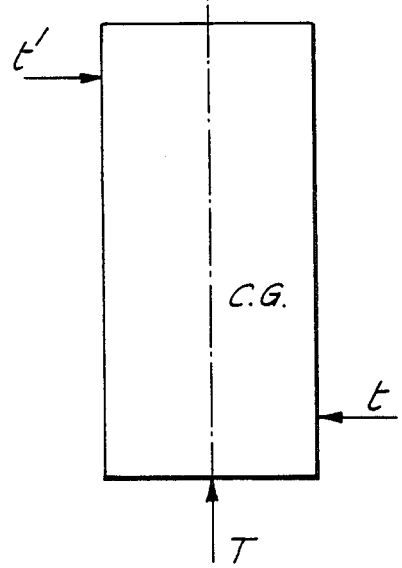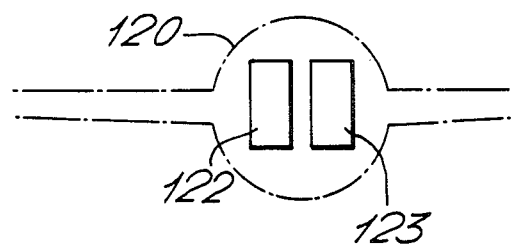

AIRCRAFT EJECTION SYSTEM

BACKGROUND OF THE INVENTION

This invention relates to an ejection system for ejecting an ejection seat/airman combination from an aircraft.

With certain aircraft designs, and certain seating arrangements for airmen in aircraft equipped with ejection systems of the kind to which the invention relates, it is sometimes necessary to ensure that, in operation of the ejection system in an emergency, the seat/airman combination will follow a predetermined curved trajectory on ejection from the aircraft.

Such a requirement may arise, for example, where the seats for two crew members of an aircraft are disposed side by side in the aircraft so that it is necessary to ensure that, on ejection, the two seats, with their respective airmen, follow divergent trajectories so that there is no risk of collision between the seat/airman combination and the two seat/airman combinations are widely separated when parachute deployment takes place.

A similar requirement may also, for example, arise where it is necessary to ensure clearance, on ejection, with respect to any part of the aircraft structure, or even where the configuration of the aircraft makes it necessary for a seat/airman combination (normally after being tilted from the normal upright position) to be ejected initially in a horizontal or inclined direction relative to the normal orientation of the aircraft prior to moving upwardly.

In British Patent Specification No. 941,683, there is disclosed and claimed an ejection system for ejecting an ejection seat/airman combination from an aircraft, comprising an ejection gun for effecting initial ejection of the combination from the aircraft in a predetermined direction relatively to the aircraft and at least one primary rocket motor independent of said ejection gun for accelerating the combination in said predetermined direction by producing a thrust vector aligned, or substantially aligned, with said predetermined direction and extending through or substantially through, the centre of gravity of the combination, the system further comprising at least one auxiliary rocket motor adapted to produce thrust in a direction such as to cause variation of the flight path of the combination produced by the operation of said ejection gun and said primary rocket motor.

Whilst the system disclosed and claimed in British Patent Specification No. 941,683 can, at least in certain cases, produce a desired curved trajectory of a seat/airman combination on ejection, this is accompanied by a spinning or yawing movement of the combination which is disadvantageous, both as regards the control of the trajectory itself, and as regards subsequent deployment of the parachute effectively and rapidly.

SUMMARY OF INVENTION

It is an object of the present invention to provide an ejection system in relation to which the above noted problem is avoided or mitigated.

According to one aspect of the invention there is provided an ejection system for ejecting an ejection seat/airman combination from an aircraft, including a primary rocket motor for accelerating the combination in a predetermined direction relative to the seat/airman combination by producing a thrust vector extending through or substantially through the centre of gravity of the combination, and having a substantial component along the principal axis, (as herein defined), of the combination and a further, lateral thrust rocket motor for producing a thrust vector which extends laterally with respect to the fore and aft axis of the seat in a direction transverse to the direction of the thrust vector produced by the primary motor, but which passes through, or substantially through the principal axis (as herein defined) of the seat/airman combination, at a position spaced from said centre of gravity, so as to produce a rotational moment acting on the combination.

By the term "the principal axis" as used herein, is meant that one of the axes of the seat/airman combination about which the combination is rotationally balanced, from an inertial viewpoint, which lies closest to parallelism with the vertical centre line of the airman.

The result of the arrangement of the lateral thrust motor in accordance with the invention is, of course, that in operation, the lateral thrust motor causes a tilting of the combination about an axis, (normally a fore and aft axis of the combination, which is transverse to the thrust vector of the main motor, so that the main motor propels the combination in a preferred curved trajectory, and yet spinning or yawing of the combination about the principal axis (as herein defined) is substantially avoided.

According to another aspect of the invention, there is provided an aircraft incorporating two ejection seats arranged side by side, and each having an ejection system according to the first-noted aspect of the invention, wherein the lateral thrust motor associated with each ejection seat is arranged to produce a rotational moment acting on the seat in the opposite rotational sense from the rotational moment acting on the other seat, so that in operation, the two seats, on ejection, are caused to travel along respective paths divergent from one another.

As a results, the risk of collision between the two seats, or the occupants thereof, during ejection, is minimised.

Embodiments of the invention are described below with reference to the accompanying drawings.

BRIEF DESCRIPTION OF DRAWINGS

In the drawings:

FIG. 1 is a plan view from above of a rocket motor pack for an aircraft ejection seat, embodying the invention, FIG. 2 is an end view of the motor pack of FIG. 1, FIG. 4 is a detailed view, partly in section, of the circled area in FIG. 1, FIG. 5 is a view in axial section of an igniter assembly for the main motor, FIG. 6 is a schematic diagram illustrating, for comparison, the behaviour, on ejection, of an ejection system incorporating the invention and a known ejection system, FIG. 7 is a view in cross-section of part of a lateral thrust motor forming part of the ejection system, FIG. 8 is a perspective view, from the rear, of the upper part of an aircraft ejection seat incorporating a variant arrangement.

FIG. 9 is a schematic side elevation view illustrating the position of the principal axis and centre of gravity of the seat/airman combination and the thrust vectors of the primary and lateral thrust rocket motors in one form of ejection seat embodying the invention, FIG. 10 is a schematic rear elevation view of the seat of FIG. 9, again illustrating the position of the principal axis and centre of gravity of the seat/airman combination and the thrust vectors of the rocket motors, and FIG. 11 is a schematic rear view showing two ejection seats embodying the invention mounted side-by-side in an aircraft.

DESCRIPTION OF PREFERRED EMBODIMENTS

Figure 3:
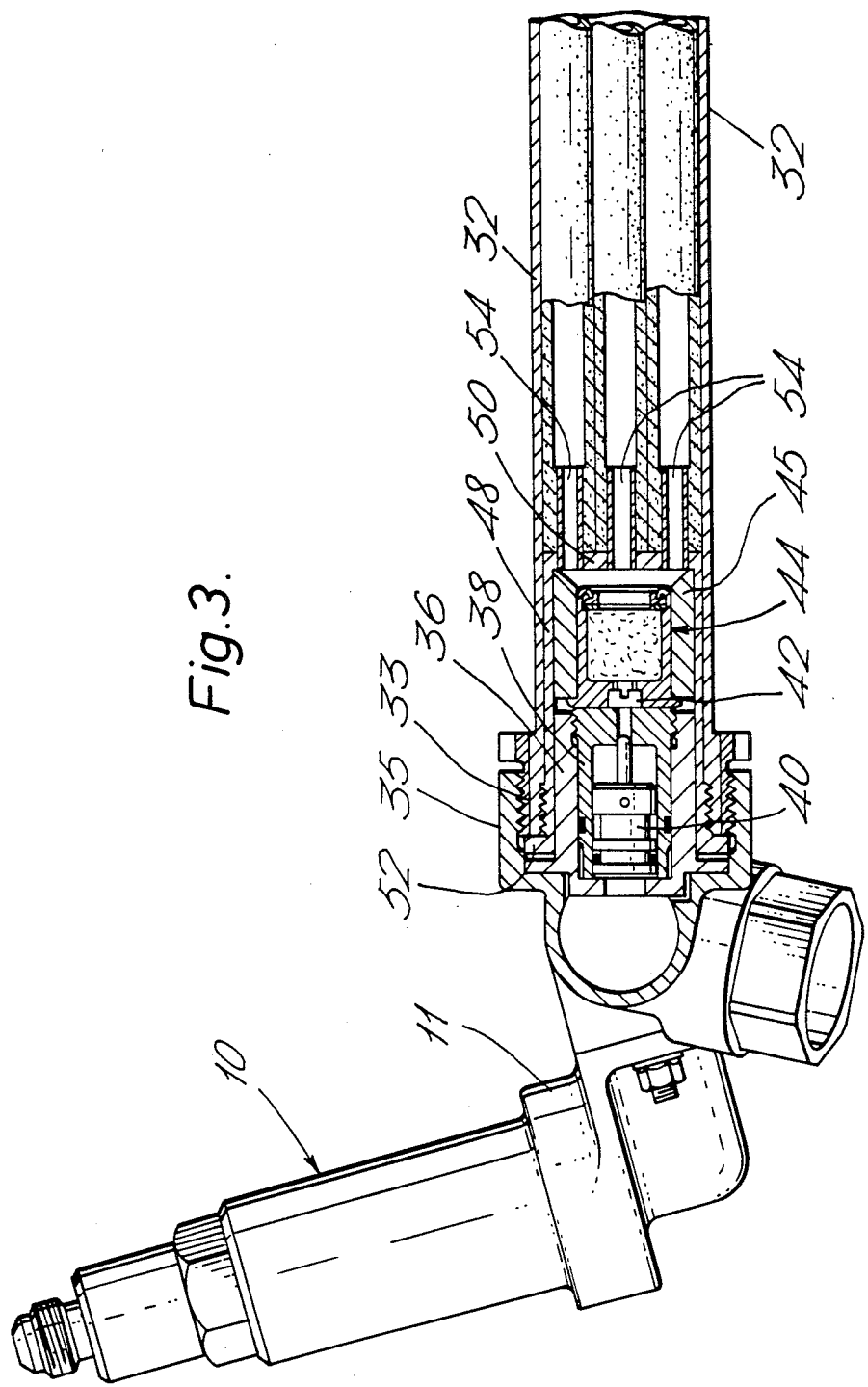
FIG. 3 is a side elevation view, partly in section, of the motor pack.

Referring to the drawings, the motor pack shown is intended to be secured to the underside of an aircraft ejection seat, for example as disclosed generally in British Patent Specification No. 941,683. The pack comprises a generally horizontal, transversely expanding tubular spine 4 which is closed at its ends and has, at intervals along its length, a series of ports 5, (see FIG. 4) which communicate with internally threaded sockets 6, which receive screw threadedly the externally screw-threaded ends of respective canisters 7, each of which contains a charge of propellant in the form of a tubular body with a central passage therethrough. The canisters 7 are arranged parallel with one another, extend horizontally in a fore and aft direction and are spaced apart transversely across the underside of the seat pan (not shown). The canisters 7 are closed at their opposite ends.

Adjacent either end of the spine 4 the latter is provided with exhaust ports 8 which communicate with respective jet nozzles 9 which, as shown, are directed downwardly and slightly rearwardly, the nozzles at either end of the spine 4 being directed in a direction which is also inclined slightly away from the vertical fore and aft plane. This vertical fore and aft plane is a vertical plane passing through the centre of gravity C.G. (FIGS. 9 and 10) of the seat/airman combination and parallel with the plane of FIG. 9. In the embodiments shown, the principal axis, indicated at P in FIGS. 9 and 10, also lies in this plane. The arrangement is such that, in operation, the thrust developed by the nozzles at one end of the spine is substantially equal to that developed by the nozzles at the other end of the spine and the net thrust due to both sets of nozzles provides a thrust vector T (FIGS. 9 and 10), the line of action of which extends in said vertical fore and aft plane, said thrust vector acting upwardly substantially through the centre of gravity of the seat/airman combination, and having a major component acting in the direction in which said principal axis (as herein defined) extends.

Also secured to the spine 4 is an igniter assembly 10, shown in greater detail in FIG. 5. The igniter assembly comprises a canister 21, open at its lower end to receive, during assembly, an igniter cartridge (not shown), the lower end of canister 21 being screw threaded to engage screw-threadedly in an internally screw-threaded socket provided in a bracket 11 secured to the spine 4, said socket communicating via an internal passage in the bracket 11 with the interior of the spine 4.

As shown in FIG. 5, the canister 21 carries, at an upper end thereof, a firing pin housing 22 screwed into the canister 21 and sealed with respect thereto by an O-ring 25. The firing pin housing accommodates a firing pin 23 in the form of a piston slidable longitudinally in a cylindrical bore 22' formed within the housing 22, said piston carrying at its lower end a firing projection 23a in axial alignment with an axial bore 22b in the housing 22.

A shear pin 24 extends transversely through the firing pin 23 and is engaged at its ends in holes in the side walls of the housing 22. In the completed assembly, the chamber within the lower part of the canister 21 is occupied by an igniter cartridge (not shown) provided with a percussion cap located at the lower end of the bore 22b remote from said piston whereby the cartridge will be ignited when the percussion cap is struck by the projection 23a. To operate the igniter, gas under pressure is supplied to the upper side of the piston via a tubular fitting 21a at the upper end of the canister 21, and when the pressure of the gas reaches a sufficiently high value, the shear pin 24 is broken allowing the firing pin 23 to be propelled downwardly by the pressure of said gas, to strike the catridge. This action initiates combustion of the cartridge within the housing 21 and the hot combustion products therefrom pass to the interior of the spine 4 and thence via the ports 5 to the bodies of propellant within the canisters 7, thereby igniting these bodies of propellant also. The hot gases from the burning propellant, passing from the nozzles 9, provide the thrust which is utilised to propel the seat/airman combination along the desired trajectory when the ejection system is operated.

The components so far described together constitute the main rocket motor, and the operation of this is very similar to that of the main motor in the ejection system disclosed in British Patent Specification No. 941,683 to which reference may be had for a more detailed discussion. If desired, the gas-pressure operated firing mechanism of the igniter assembly in the present embodiment may be replaced by a spring-operated mechanism such as disclosed in Specification No. 941,683.

Disposed on one side of the motor pack, i.e. in a position which will underlie one side of the seat pan, is a lateral thrust rocket motor 30 which includes a propellant-containing canister 32 which is secured at one end to the spine 4 and extends parallel with the canisters 7. The canister 32 carries, at its end remote from the spine 4, a nozzle 34 directed laterally, i.e. horizontally in the present instance, away from the canisters 7. The nozzle 34 is so disposed that, in operation, the thrust vector t produced by the lateral thrust motor 30 passes through the principal axis P (as herein defined) of the seat/airman combination at a position somewhat below the centre of gravity, C.G., of the combination. The thrust vector t extends laterally with respect to the fore and aft axis of the seat in a direction transverse to the direction of the thrust vector T. Thus, that while the lateral thrust motor 30 is burning, a moment is applied to the seat/airman combination which produces a rotation of the latter, clockwise in FIG. 10, about a substantially fore and aft axis. In the preferred embodiments, the lateral thrust vector t is perpendicular to said fore and aft plane. The position of the nozzle 34 is indicated at 34a in FIG. 9.

The lateral thrust motor 30 is adapted to be ignited by an igniter mechanism similar to the igniter assembly 10 and adapted to be operated by the pressure of the combustion gases within the passage in the spine 4. Thus, as shown in FIG. 3, the canister 32 has an externally screw-threaded end portion 33 which is screwed into an internally screw-threaded socket 35 integral with the spine 4 and communicating via a port with the longitudinal passage in the spine 4. Located within this end of the canister 32 is a shell 48 which is in the general form of a hollow cylinder closed at one end by an end wall 50 and open at its other end where it is also provided, externally, with an annular flange 52. The shell 48 has, adjacent the flange 52, an external screw thread which engages in an internal screw thread at the end of canister 32. The shell 48 is screwed into the canister 32 until the flange 52 bears upon the end of the canister 32. Located within the socket 35 and fitting closely within shell 48 is a flanged cap 36 which in turn receives a firing pin housing 38 similar to the housing 22 in the assembly 10 shown in FIG. 5 and which, in like manner, is provided with a cylindrical bore within which is disposed a firing pin 40 having a body in the form of a piston and a firing projection which can be extended through an axial bore at the end of housing 38 for engagement with a percussion cap 42 of an igniter cartridge 44 disposed within the shell 48 at said end of the housing 38. The cartridge 44 is mounted within an annular spacer element 45 fitting snugly within the cylindrical cavity within shell 48. As in the case of the assembly 10, the firing pin 40 is normally retained in its retracted position by a transverse shear pin engaging in the walls of the housing 38. The cylindrical bore within which the firing pin 40 is disposed communicates with the bore along the spine 40 via a port provided in the respective end of the cap 38, which end is itself disposed in a respective port provided at the base of the socket 35.

The propellant in the canister 32 occupies the space therein between the end wall 50 of the shell 48 and the end of the canister 32 at which the nozzle 34 is disposed. The propellant within the canister 32 is in the form of seven tubular bodies 52 packed as shown in cross section in FIG. 7. The end wall 50 of shell 48 is formed with correspondingly disposed apertures in which are fitted tubular spigots 54 which project into the passages through the respective bodies 52. The spigots 54 serve to conduct the hot combustion products from the igniter cartridge 44 to the interior of the bodies 52 to initiate burning thereof.

In operation of the ejection system the main rocket motor is ignited by operation of the igniter assembly 10 and the pressure of the combustion products within the spine 4, acting on the firing pin 40, subsequently breaks the shear pin holding the firing pin 40 in position and propels the firing pin 40 along the housing 38 to stroke the percussion cap 42 and fire the cartridge 44, thereby igniting the lateral thrust motor. The nozzles 9, 34 are normally, in the same way as disclosed in Specification No. 941,683, closed by frangible plates, not shown, which are broken by the pressure of the gases within the spine and canisters when the ejection system is operated.

Since the lateral thrust motor 30 is independent of the main motor, in the sense that the interior of the canister 32 leading to the nozzle 34 is not in gas communication with the passage along the spine 4, (although initiation of burning of the lateral thrust motor is produced automatically by burning of the main motor), the burning time of the lateral thrust motor can be selected independently of that of the main motor and can thus be adjusted or selected to suit seat requirements.

Whilst, in the specific embodiment described, the thrust vector produced by the lateral thrust motor 30 passes through the principal axis (as herein defined) of the seat/airman combination at a position somewhat below the centre of gravity of the combination, if desired, the thrust vector produced by the lateral thrust motor may pass through said principal axis somewhat above said centre of gravity. In this case, of course, to produce rotation in the same sense of the seat/airman combination, it will be necessary for the lateral thrust motor to be disposed on the opposite side of the seat.

The lateral thrust motor 30, being independent of the main motor in the above noted sense, may, of course, be physically separate from the main motor also, and may be located on a different part of the seat, provided that its thrust vector passes through said principal axis at a position such as to provide the desired movement, and that the desired time relationship between the operation of the main motor and the lateral thrust motor is secured.

Thus, in a variant, shown in FIG. 8, the lateral thrust motor 30a is mounted, in a transverse horizontal orientation, at a position adjacent the upper end of the ejection seat. FIG. 8 shows, in perspective, fragmentarily, the rear of the seat at the upper end thereof, at which end, on the front of the seat, is supported the airman's parachute, which also serves as a headrest in normal, non-emergency situations. The ejection seat comprises, in known manner, a seat pan, including a base portion, to which the main rocket motor is secured and a back portion which is secured to a main beam structure comprising two parallel upwardly extending beams 32 between which is disposed the ejection gun which effects initial ejection of the seat from the aircraft. The beams 32 also carry various other components such as a drogue gun operable to project, from the seat, a piston to which is connected a drogue parachute deployment line, a gas operated shackle release mechanism by means of which, at a desired time, the connection of the drogue parachute with the seat can be released, allowing the drogue parachute to deploy the airman's main parachute and allow separation of the airman from the seat, as well as various timing, barometric pressure sensing and acceleration/deceleration-sensing devices controlling seat operation.

As shown, the lateral thrust motor, in the variant of FIG. 8, takes the form of a straight generally cylindrical body carrying a nozzle 34 in axial alignment therewith, at one end, and carrying, at the other end, a socket 35a which carries a connector 37 to which is connected one end of a hose 100, the other end of which is connected, in a manner not shown, with an outlet from the rocket initiator unit 10, for example by means of a connection with the manifold 4. The internal structure and operation of the lateral thrust motor 30a is substantially the same as that of the motor 30 of FIG. 3, so that when the rocket initiator unit 10 is operated, the pressurised gas generated is supplied, via the hose 100, to the connector 37 and socket 35a, causing the firing pin within the motor 30a to be operated to ignite the motor 30a.

The outer casing of the motor 30a is formed with lugs 102, 104, provided with bores to receive bolts 106, 108, by means of which the motor casing is secured to the beams 32 or to structure secured in turn to these beams. Preferably the bolts 106 passing through the lugs 102 are of a different diameter from the bolts 108 passing through the lugs 104, and the respective bores in the lugs which receive the bolts are of correspondingly different diameters thus ensuring that it is not possible to fit the motor 30a accidentally at 180° from its correct orientation, i.e. with the nozzle 34 directed to the right rather than to the left as shown in FIG. 8.

In this variant the thrust vector $t^1$ produced by the lateral thrust motor 30a is again perpendicular to the for and aft plane containing the centre of gravity C.G., the thrust vector $t^1$ passing through the principal axis P at a position above the centre of gravity C.G. of the seat- /airman combination. Thus, while lateral thrust motor 30a is burning, a moment is applied to the seat/airman combination which produces rotation of the combination, clockwise in FIG. 10, about a substantially fore and aft axis.

For convenience, the thrust vectors t and $t^1$ are both illustrated in FIG. 10, but it will be understood that normally only one lateral thrust motor need be provided on a seat.

It will be appreciated that the thrust required from the lateral thrust motor to produce a given angular acceleration of the ejection seat/airman combination is reduced with increasing distance of the thrust vector of the lateral thrust motor from the centre of gravity of said combination, so that it may be possible to make a lateral thrust motor disposed adjacent the upper end of the seat backrest somewhat smaller and lighter than a lateral thrust motor mounted on the seat pan.

A typical application in which the ejection system described with reference to the drawings might be utilised is where the seating arrangements in an aircraft is such that two airmen are seated side by side adjacent one another, so that it is necessary to ensure that on ejection, the two seats follow diverging trajectories to avoid interference with one another. FIG. 11 illustrates such an arrangement, the aircraft being indicated in cross-section, partially, in broken lines, at 120, and the two seats being indicated at 122 and 123. FIG. 6 shows, on the left hand side, the operation of a known ejection system adapted to propel a seat/airman combination along a trajectory divergent from the vertical axis between the respective two seats in such an aircraft having such a seating arrangement, the required divergence of the trajectory from the vertical being produced by a lateral thrust component not directed through the principal axis of the seat/airman combination. To the right hand side of FIG. 6 is shown, for comparison, the corresponding operation of the embodiment of the invention described with reference to the drawings. It will be noted that whilst both systems provide the desired divergence of the trajectories from the vertical, in the case illustrated on the left hand side of FIG. 6 this is accompanied by a yawing or spinning movement of the seat about the principal axis, while this is entirely absent in the case illustrated on the right hand side of FIG. 6, which relates to the above-described embodiment of the invention.

I claim:

1. An ejection system for an aircraft for two airmen, comprising:
    an ejection seat for each airman; and
    means for ejecting the ejection seat/airman combinations from the aircraft so that the combinations travel along respective paths divergent from one another, said means including, for each seat/airman combination,
        a primary rocket motor,
        a further, lateral thrust rocket motor,
        means mounting the primary rocket motor for accelerating the combination in a predetermined direction relative to the seat/airman combination by producing a thrust vector extending through or substantially through the centre of gravity of the combination, and having a substantial component along the principal axis of the combination, said principal axis being that axis of the airman/seat combination about which the combination is rotationally balanced and which lies closest to parallelism with the vertical centre line of the airman, said principal axis extending through or substantially through the centre of gravity of the combination but being non-parallel to said thrust vector, and
        means mounting the further, lateral thrust rocket motor for producing a further thrust vector which extends laterally with respect to the fore and aft axis of the seat in a direction transverse to the direction of the thrust vector produced by the primary motor, but which passes through, or substantially through the principal axis of the seat/airman combination, at a position spaced from said centre of gravity, so as to produce a rotational moment acting on the combination,
    wherein the lateral thrust motor associated with each ejection seat is arranged to produce a rotational moment acting on the seat in the opposite rotational sense from the rotational moment acting on the other seat.

2. The ejection system of claim 1 wherein, for each seat/airman combination, said thrust vector of the primary rocket motor lies in the same fore and aft plane, relative to the seat/airman combination, as said principal axis.

3. The ejection system of claim 1 including, for each seat/airman combination, a triggering mechanism for activating said lateral thrust rocket motor, said triggering mechanism being a gas-pressure-responsive mechanism operable by the pressure of the combustion gases within said primary rocket motor.

4. The ejection system of claim 1 wherein each seat has a seat pan having a base and a back and wherein, for each seat/airman combination, the primary rocket motor and the lateral thrust motor are both disposed below the base of the seat pan, and the thrust vector of the lateral thrust motor is arranged to pass through said principal axis below the centre of gravity of the seat/airman combination.

5. The ejection system of claim 1 wherein each seat has a seat pan having a base and a back and wherein, for each seat/airman combination, the primary rocket motor is disposed below the base of the seat pan and the lateral thrust motor is mounted at the rear of the seat back, above the level of the base of the seat pan, and is so arranged that the thrust vector of the lateral thrust motor passes through the principal axis of the seat/airman combination above the centre of gravity of said combination.

6. The ejection system of claim 1 wherein said ejection seats are arranged side by side.

* * * * *